Jan. 18, 1949.     R. T. CAMERON     2,459,498
COFFEE MAKER
Filed March 25, 1946     2 Sheets-Sheet 1
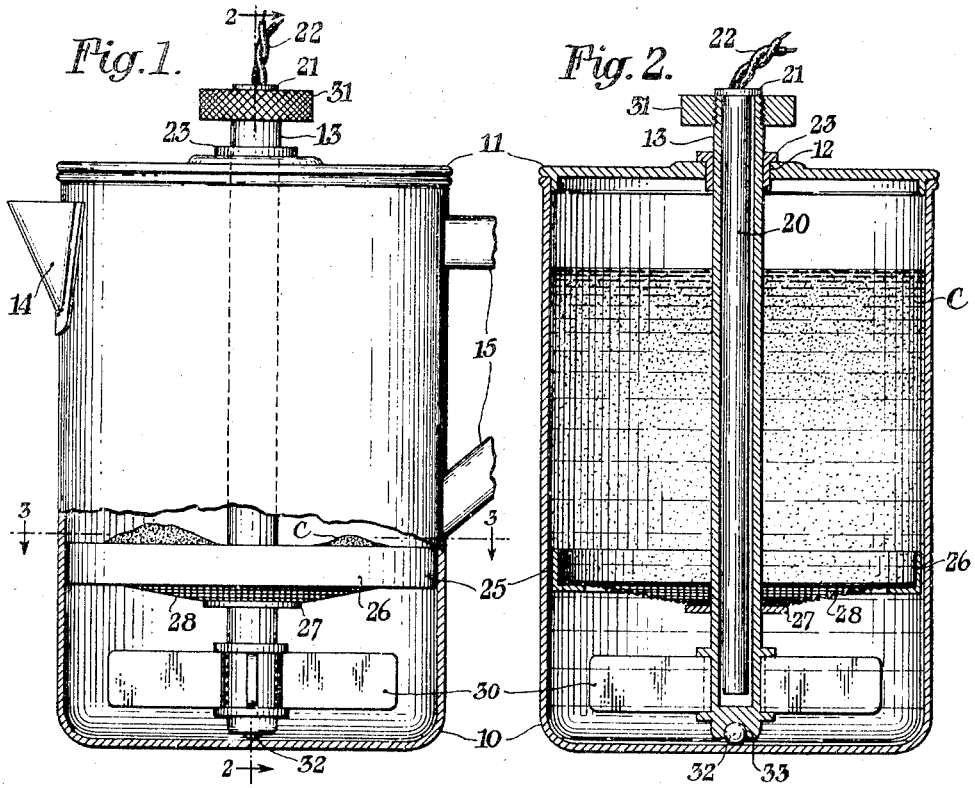
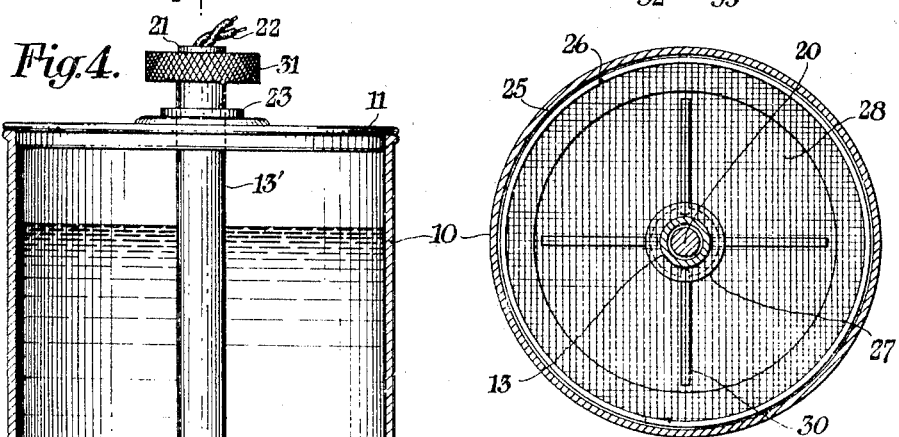
Robert T. Cameron,
INVENTOR;

Jan. 18, 1949.  R. T. CAMERON  2,459,498
COFFEE MAKER
Filed March 25, 1946  2 Sheets-Sheet 2
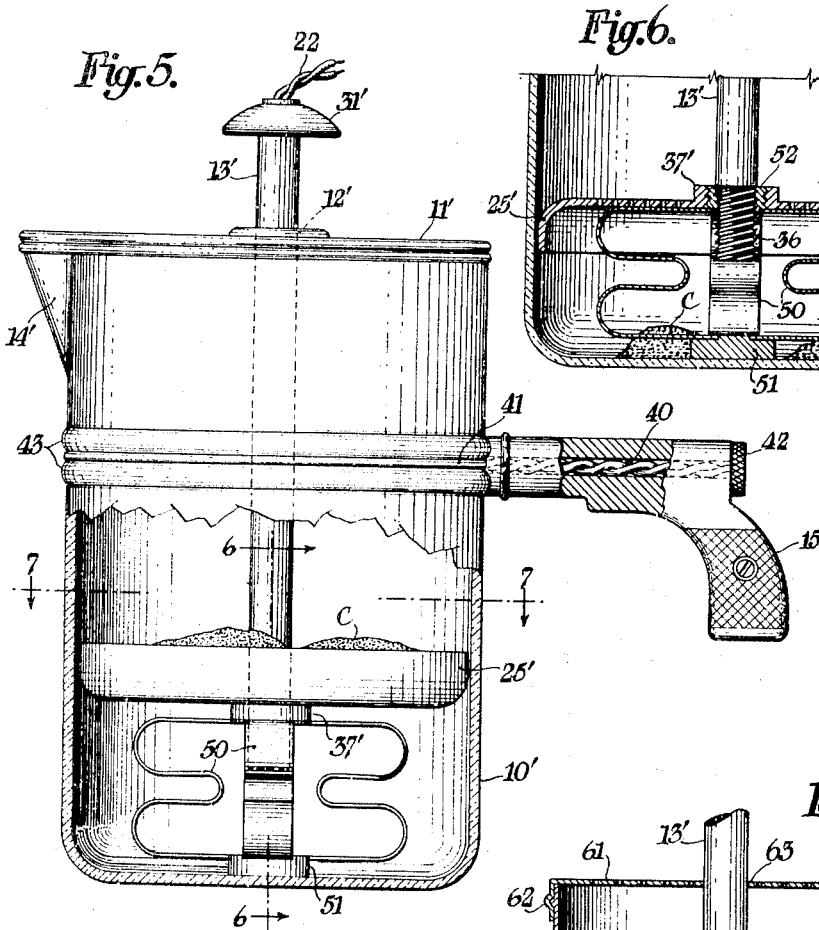
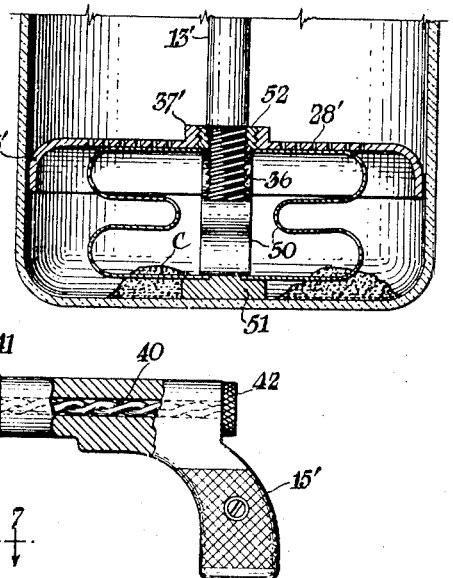
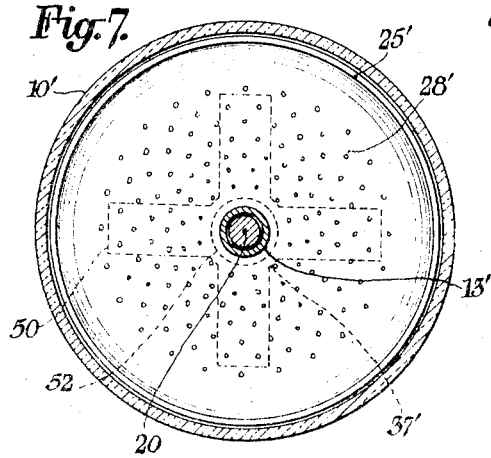
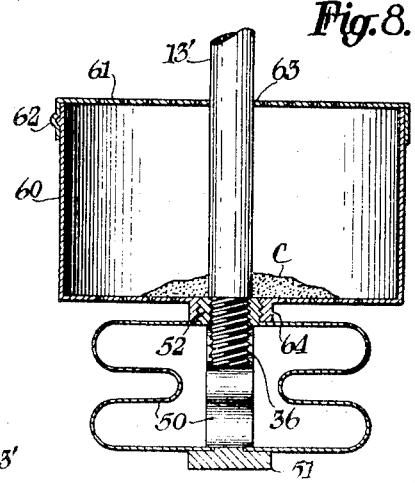
Robert T. Cameron,
INVENTOR;
BY
ATTORNEY Patented Jan. 18, 1949

2,459,498

UNITED STATES PATENT OFFICE 2,459,498

COFFEE MAKER

Robert T. Cameron, Knoxville, Tenn.

Application March 25, 1946, Serial No. 656,984

4 Claims. (Cl. 99—287)

This invention relates to coffee making apparatus, and more particularly to electrically heated, churn-type coffee makers.

The coffee makers heretofore in use have been restricted in operation to one of the three methods of making coffee, namely: drip, percolator or vacuum, and have been incapable of making coffee that is free from caffe-tannic. Each of these methods operates by boiling the coffee liquid and thereby dissolving the caffe-tannic along with the aromatic oils which are the desirable flavor producing part of the coffee. Furthermore, the prior art coffee makers of the electrically heated type are incapable of use with an extraneous source of heat, such as a stove burner, as the electric coils are permanently positioned in the bottom of the coffee maker where they can be seriously damaged by extraneous heat. In addition, glass coffee makers are not true electric devices as they do not have self contained electrical heating units. Moreover, the prior art apparatus is highly wasteful of ground coffee due to the fact that they have no means for physically agitating the brew to increase the leaching action of the ground coffee.

Having in mind the defects of the prior art apparatus, it is an object of this invention to provide a coffee maker that is equipped with an electrical heating unit which is more efficiently arranged, and positioned so that it will not be damaged by extraneous heat but, conversely, may be employed in conjunction with an extraneous source of heat, if so desired. The contemplated design also permits the incorporation of an electrical heating unit within a glass coffee maker. It is desired to provide means to increase the leaching cation by physical agitation to thereby perform the brewing operation more efficiently and quickly. Furthermore, it is an objective to provide a coffee maker that is capable of operating in any desired manner, whether the process be drip, percolator or vacuum. One of the features of the invention resides in its ability to produce a coffee brew economically and without boiling so as to remove only the aromatic oils from the coffee grounds without dissolving the harmful caffe-tannic. It is contemplated that the invention shall incorporate simplicity of design and economy of construction.

The foregoing objects and others ancillary thereto are preferably accomplished, according to a preferred embodiment of the invention, by a coffee making apparatus comprising a container or pot having a closed end tube depending centrally thereof, from the cover, and removably containing an electrical heating unit. The tubular member, preferably, is fabricated from a metal or other material having high thermal conductivity and the heating unit is in the form of an elongated rod, and preferably consists of a caloric element. By this means of heating, the coffee brew is heated radially from the center of the mass of liquid and the electric element is out of contact with the body of the pot so that it can not be damaged by extraneous heat. This arrangement also permits the removal of the electric unit, if desired, and the use of the coffee maker with extraneous heat, although the heating unit need not be removed because, being centrally positioned, it is fully protected by the surrounding contents of the pot.

The circular sidewalls of the pot are vertical and free from deformation so that a filter member may be affixed to the tubular element and inserted in the pot, fitting snugly with the walls thereof to prevent the passage of coffee grounds therebetween. By this arrangement the coffee may be placed in the bottom of the pot and retained there by the filter member when the coffee brew is poured, or the ground coffee may be placed on top of the filter member and the brew filtered by withdrawing the filter member from the pot, thereby removing the grounds, before the brew is poured.

It is well recognized that the most desirable coffee brew is that in which the aromatic oils have been dissolved from the ground coffee, but is devoid of the bitter, strongly astringent caffe-tannic. In the prior methods of making coffee, however, the caffe-tannic has been absorbed in the brew due to the high temperatures that have been employed in making the brew, it being the custom in all prior methods to raise the brew-making water to the boiling point which is sufficient to dissolve the caffe-tannic from the ground coffee. In order to eliminate the removal of the caffe-tannic, the present invention contemplates the combination of an agitating means for substantially increasing the leaching action while employing a reduced temperature which is sufficient to release the aromatic oils, which are laxative, without dissolving the caffe-tannic, which is a bitter astringent.

Specifically, an agitating means is in the form of churn-like paddles or resilient spring members which are mounted on the lower end of the heating tube so that the tube can be used as a handle and twirled or reciprocated vertically to produce the desired agitation while simultaneously providing the desired heating temperature. The agitating means may be mounted on the tube in any desired manner, but it is preferably removably attached thereto, and it may also removably support or be attached to the filter member.

The novel features that are considered characteristic of the invention are set forth with particularity in the appended claims. The invention, itself, however, both as to its organization and its method of operation, together with additional objects and advantages thereof, will best be understood from the following description of specific embodiments when read in connection with the accompanying drawings, wherein like reference characters indicate like parts throughout, and in which Fig. 1 is a side view in elevation of a coffee maker, a portion of the wall being broken away to show the centrally located heating member supporting a filter plate and agitating paddles.

Fig. 2 is a cross sectional view taken on line 2—2 of Fig. 1.

Fig. 3 is a cross sectional view taken on line 3—3 of Fig. 1.

Fig. 4 is a cross sectional view taken vertically through the coffee maker and showing a modified arrangement of the filter and agitating paddles.

Fig. 5 is a side view in elevation showing a modified coffee maker, part of the wall being broken away to show a modified filter plate with a spring-type agitator.

Fig. 6 is a cross sectional view taken on line 6—6 of Fig. 5 and showing the filter differently arranged.

Fig. 7 is a cross sectional view taken on line 7—7 of Fig. 5, and

Fig. 8 is a cross-sectional view taken vertically through a modified form of filter member assembled with a spring type agitator.

A coffee maker to overcome the defects hereinbefore enumerated must have at least two totally distinct characteristics: it must be capable of heating the coffee brew from the inside outwardly; and it must be capable of physical agitation of the brew, with the grounds therein, so as to eliminate the need for excessive temperatures. Accordingly, one embodiment of the invention, referring to Figs. 1 and 2 of the drawings, is constituted by a container or pot 10 having straight and smooth vertical walls, and a cover 11 having a centrally located aperture 12 adapted to receive a tubular member 13. The container 10 is shown as being of the usual metal type and is provided with the usual pouring spout 14 and handle 15.

The tubular member 13 is formed from a material having high thermal conductivity and is adapted to removably receive an elongated rod-like electric heating element 20. This electric heating element may be in any desired form such as an electric conductor coiled in the form of a resistance element around a rod-like insulator, but a caloric unit is preferred. The upper end of the heater 20 has a radial flange 21 that overlies the end of the tube 13 to suspend the heater within the tube 13 and may be connected to a typical control member and source of electrical energy by conductors 22. An insulating collar 23 may be seated in the aperture 12 to prevent direct heat conductivity to the cover 11. By this arrangement, heat is provided centrally of the coffee maker and radiates uniformally through the liquid, thereby expediting the heating process.

A filter plate 25 is mounted on the tube 13 and extends to fit snugly with the smooth vertical walls of the container or pot 10. The filter plate is shown as comprising an L-shaped ring 26, one flange of which fits snugly with the walls of the container 10, and the other flange extends radially inward. A collar 27 is mounted on the tube 13 with a foraminous member 28 extending from the collar 27 radially to the inturned flange of the ring 26. This structure forms an open basket for supporting the ground coffee C, as shown in Fig. 1, and for filtering the grounds from the liquid after it is brewed. It will be understood that the apertures of the foraminous member 28 are small enough to prevent the passage of coffee grounds but will permit relatively free flow of liquid therethrough. The inturned flange of the ring 26 serves the dual function of providing a connecting portion for the foraminous member 28, and also forming an imperforate surface around the edge portion of the filter for collecting the very fine coffee grounds that migrate to the outer portions of the pot. The inturned flange may be of any suitable width and it has been found that a flange one-half of an inch wide is a suitable size for an eight cup coffee pot.

In order to receive the maximum benefit from the coffee grounds and without heating the brew to a temperature sufficient to release the caffetannic, it is desirable to physically agitate the brew to increase the leaching effect of the coffee grounds. Accordingly, agitating means in the form of paddles 30 are mounted in the lower end, and a knurled handle or knob 31 is provided at the upper end of the tube 13. The knob 31 may be fixed to the tube 13 or removably positioned as shown in Fig. 2. The paddles 30 may be of any desired form and they may be rigid or comprise flat springs. By this arrangement, the operator may provide the necessary agitation of the brew by spinning or twirling the knob 31 and thereby spinning the paddles 30 to churn the liquid within the container 10. To provide freedom of rotation, the tube 13 may be provided with a bearing in the form of a ball 32 which is seated within a socket 33 in the end of the tube 13, and rests on the bottom of the container 10, as best shown in Fig. 2. From the foregoing it will be seen that the tube 13 forms a handle, operatable from the top, for placing the filter and for operating the agitating means as well as providing protection for the heating element.

It will be seen in Fig. 1 that the filter member 25 is turned upwardly forming a plate for holding the coffee. When a suitable amount of ground coffee is deposited on the filter 25, the necessary amount of water may then be poured in the container 10, as shown in Fig. 2, whereupon the ground coffee disperses through the water above the filter 25 and floats toward the top, the coffee being prevented from dispersing through the water in the bottom portion of the pot by the filter 25. Coffee is full of tiny oil tubes, or sacs, which cause it to float, but when sufficiently heated, the oil tubes burst and release the aromatic oils, whereupon the coffee grounds tend to sink. When the coffee is brewed the grounds tend to settle on the filter 25 which prevents them from passing to the bottom of the container 10. The filter 25 may then be withdrawn, by means of the handle 13, collecting any grounds dispersed in the brew and removing all of the grounds from the pot. The brew may then be poured, it being completely free of grounds.

A modified form and arrangement of the structure is shown in Fig. 4 wherein it will be seen that the heating tube removably supports the agitating means, which in turn removably supports the filter means. Specifically, paddles 30 are supported by a collar 35 that is internally threaded and adapted to receive the threaded lower end of the heating tube 13'. One end 36 of the collar 35 is externally threaded and is adapted to receive an internally threaded collar 11 which supports the flange 27' of the filter plate 25. The lower end of the tube 13' is rounded to form a ball 32' for bearing against the bottom of the container 10, rather than employing a separate ball. This demountable arrangement is advantageous both with respect to versatility of use, and to replacement of parts.

In Fig. 4 the filter plate 25 is turned downwardly to retain the coffee grounds in the bottom of the pot so that the brew may be poured without bothering to remove the grounds as is necessary when the arrangement shown in Fig. 2 is used. With the removable structure the filter plate may be threaded on the collar 35 in an upturned position as well as the downturned position in which it is shown. Furthermore, if it is desired to have the filter plate upturned and to have the paddles 30 above the filter plate so as to directly agitate the coffee grounds, the assembly shown in Fig. 4 may be inverted by removing the collar 35 from the tube 13' and replacing the collar 35 in an inverted position.

In view of the foregoing description, it should be readily evident that with the removably positioned type of structure, the filter plate may be arranged in an upright position with the paddles either below the filter plate so that the agitation thereby is imparted primarily to the liquid, or the paddles may be above the filter plates so that they directly agitate the coffee grounds. Conversely, the filter plate may be turned downwardly to enclose the grounds in the bottom of the pot and the paddles thereunder, as shown in Fig. 4, to agitate the coffee grounds directly. Of course, by extending the lower end of the tube 13' the filter plate could be turned downwardly with the paddles positioned thereabove, in which event the agitation of the grounds would be secondary.

One advantage of the present invention is its adaptability to glass coffee makers, which heretofore have been limited to extraneous electrically produced heat. A glass container 10' is shown in Fig. 5 as having a cover 11' provided with a centrally located hole 12' for receiving the heating tube 13'. The container 10' has a pouring spout 14' formed thereon. The handle for the container 10' comprises a hand grip 15' having a bore 40 extending therethrough within which are located the ends of a loop 41, formed of wire or the like, which encircles the container 10'. The loop ends are affixed to a thumb wheel 42 by which they may be twisted to tighten the loop 41 and thereby firmly hold the container. The loop 41 is seated within a channel between a pair of parallel ridges 43 formed around the exterior of the container 10'.

A modified filter plate 25' is shown in Fig. 5 as comprising a dished unitary member having a plurality of apertures forming a foraminous section 28' within the central portion thereof. The edge portions of the dish member, however, are solid, as best shown in Fig. 7, so that they may collect finer grounds which settle toward the edges of the pot. The filter plate 25' is similar to the filter structure shown in Fig. 4, in that it is provided with an internally threaded collar 37' by which it is adapted to be removably mounted in position, preferably on the agitating means.

The agitating means in this modification is shown as comprising a plurality of looped leaf springs 50 which are joined at one of their ends by a collar 51, which form a bearing for supporting the structure on the bottom of the pot. At the other of their ends the springs 50 are connected by an externally and internally threaded collar 52 which is adapted to receive the filter plate collar 37' and, in addition, to be threaded on the lower end of the heating tube 13'. By this arrangement the physical agitation of the liquid coffee grounds is provided by intermittently depressing the tube 13', thus reciprocating the filter plate 25' by compressing and retracting the springs 50. The heating tube 13' extends somewhat above the cover 11', to permit the reciprocation thereof, and it terminates in a handle 31'.

To provide the necessary agitation, the operator depresses the handle 31' thereby compressing the springs 50 and lowering the filter plate 25'. Upon releasing the handle 31' the springs 50 expand to their normal position and raise the filter plate 25' to its normal position. Repetition of this operation produces a pumping or churning effect to completely circulate the liquid with the coffee grounds. In this modification the filter plate 25' cooperates in providing the desired agitation although the springs produce considerable agitation by themselves, being broad and flat. Due to the agitation produced by the filter plate, however, any type of spring may be employed.

In Fig. 5 the filter plate 25' is shown in an upright position and the ground coffee is placed thereabove for the brewing operation. On the other hand, in Fig. 6 the filter plate 25' is shown in inverted position and the ground coffee is placed thereunder to be contained by the filter plate and the bottom of the pot. As with the prior modifications, the filter plate 25' must be withdrawn if the ground coffee is above it, in order to remove the grounds from the brew before it is poured. On the other hand, if the ground coffee is below the plate it need not be removed in view of the fact that it is filtered as the brew is poured.

Still another modification is shown in Fig. 8 wherein the filter member is in the form of a foraminous container 60 including a cover 61 which is attached thereto by a suitable latching means such as the bayonet lock 62. The cover 61 is provided centrally with an aperture 63 for receiving the heating tube 13' and the container 60 is provided with an internally threaded collar 64 for threading on the collar 52 of the spring agitator 50. It will be understood that the paddle agitator shown in Fig. 4 may be substituted by threading the collar 64 on the paddle collar 36. The agitating springs may be positioned below the container 60 whereby it may be reciprocated in the same manner as described relative to the filter plate 25'. With this modification the ground coffee is placed within the container 60 and retained therein so that the grounds may be removed or they may be left in the container as the brew is poured.

In all of these various modifications it will be seen that they each include the three principle elements of the present invention. Each modification includes a centrally positioned tubular handle containing an electric heating element. In addition, each modification comprises a filter member connected to or supported by the tubular handle. Furthermore, each modification is provided with an agitating means, for physically agitating the liquid and which is connected to the tubular handle and may support the filter member. In all instances the filter member acts as a supplementary agitating means, either through a reciprocating motion or a whirling motion.

In operation, the desired amount of coffee is placed above the filter member in the arrangements shown in Figs. 1, 2 and 5, below the filter member in the arrangements shown in Figs. 4 and 6, or within the filter member in the arrangement shown in Fig. 8. The necessary amount of water is then added to the pot and the conductors 22 are connected to a convenient source of electric current. The electric heating element 20 then begins to generate heat which is conducted through the tubular handle 13 to the surrounding liquid.

If it is desired to expedite the brewing operation, the container may be placed on the stove, or other source of extraneous heat, without danger of damage to the heating element 20, in view of the fact that it is completely surrounded by liquid. In normal operation, however, extraneous heat is not employed and a suitable control of any desired type may be employed for regulating the temperature of the element 20. Thus the heat generated may be maintained below boiling point so that the caffe-tannic will not be dissolved from the ground coffee. When the liquid has become heated it may then be agitated by the operator by either twirling the knob 31 to spin the filter 25 and the paddles 30, or he may repeatedly depress the handle 31' to work the springs 50 and reciprocate the filter plate 25' or container 60, whichever is used.

When the coffee is sufficiently brewed the grounds may be separated from the liquid by removing the filter plate, if the arrangement shown in Figs. 1, 2 and 5 is employed, thereby leaving a clear brew that is free of coffee grounds. This arrangement is preferable when relatively large amounts of coffee are brewed, and particularly is preferable in commercial type apparatus for employment in restaurants or the like. On the other hand, if the arrangements shown in Figs. 4, 6 and 8 are employed, the brew may be poured without removing the grounds, they being trapped by the filter member. In Figs. 4 and 6 the grounds are retained in the bottom of the pot and in Fig. 8 they are housed by the foraminous container 60.

It is to be understood that in the event that the individual prefers the drip, percolator or vacuum brewed coffee then the heat produced by the element 20 may be increased to the desired temperature, drip coffee being made at boiling point, percolator coffee being made at a slightly higher temperature, and vacuum coffee being made at a temperature of 212° F. It is to be noted that this coffee maker has the additional advantage of being usable without employing the heating element 20 but by relying solely on extraneous heat. This feature is particularly advantageous in certain instances due to the lack or failure of a source of electric current. If desired, the heating element may be removed in this case to eliminate the bother of handling the connection cord 22 and protecting it from the extraneous heat.

Although certain specific embodiments of the invention are shown and described, it is obvious that many modifications thereof are possible. The invention, therefore, is not to be restricted except insofar as is necessitated by the prior art and by the spirit of the appended claims.

That which is claimed, as new, is:

1. In a coffee maker including a container within which coffee may be brewed and a cover therefor, in combination with said cover of an aperture centrally therethrough, a tubular handle removably inserted through said aperture in said cover and positioned centrally of said container, heating means removably supported within said handle for heating the coffee making water, agitating means within said container and operatively connected with said handle, and means supported within said container by said handle for filtering coffee grounds from the coffee brew.

2. A coffee maker comprising, in combination, a container within which coffee may be brewed, a cover for said container and having a centrally positioned aperture, a rod-like handle movably positioned centrally in said container with its upper end extending through said cover aperture, heating means within said handle for heating the coffee making water in said container, agitating means within said container and operatively connected with said handle to be operated from the protruding upper end of said handle, and means supported within said container by said handle for filtering coffee grounds from the coffee brew.

3. A coffee maker comprising, in combination, a container within which coffee may be brewed, a cover for said container and having a centrally positioned aperture, spring means positioned in the bottom of said container, a rod-like handle resiliently supported by said spring means extending through said cover aperture for manual compression of said spring means for agitating the contents of said container, and means supported within said container by said handle for filtering coffee grounds from the coffee brew.

4. A coffee maker comprising, in combination, a container within which coffee may be brewed, a cover for said container and having a centrally positioned aperture, spring means positioned in the bottom of said container, agitating means within said container above said spring means, and a handle resiliently supported by said spring means and supporting said agitating means, the upper end of said handle extending through said cover aperture for manual compression of said spring means to reciprocate said agitating means, and means supported within said container by said handle for filtering coffee grounds from the coffee brew.

ROBERT T. CAMERON.

REFERENCES CITED

The following references are of record in the file of this patent:

UNITED STATES PATENTS

| Number | Name | Date |
|---|---|---|
| 374,270 | Richards | Dec. 6, 1887 |
| 1,472,704 | Ward | Oct. 30, 1923 |
| 1,946,247 | Wales | Feb. 6, 1934 |
| 2,053,021 | Cassol | Sept. 1, 1936 |
| 2,135,313 | Nolte | Nov. 1, 1938 |
| 2,344,386 | Berger | Mar. 14, 1944 |

FOREIGN PATENTS

| Number | Country | Date |
|---|---|---|
| 2,992 | Great Britain | 1880 |
| 28,258 | France | Oct. 28, 1924 |